United States Patent
Zaifman et al.

(10) Patent No.: US 7,222,268 B2
(45) Date of Patent: May 22, 2007

(54) SYSTEM RESOURCE AVAILABILITY MANAGER

(75) Inventors: Arthur L. Zaifman, Marblehead, MA (US); Stephen J. Ciavaglia, Merrimack, NH (US)

(73) Assignee: Enterasys Networks, Inc., Andover, MA (US)

( * ) Notice: Subject to any disclaimer, the term of this patent is extended or adjusted under 35 U.S.C. 154(b) by 1275 days.

(21) Appl. No.: 09/954,711
(22) Filed: Sep. 18, 2001

(65) Prior Publication Data

US 2002/0087687 A1 Jul. 4, 2002

Related U.S. Application Data

(63) Continuation-in-part of application No. 09/954,471, filed on Sep. 17, 2001.

(60) Provisional application No. 60/233,395, filed on Sep. 18, 2000.

(51) Int. Cl.
*G06F 11/00* (2006.01)
(52) U.S. Cl. ................... 714/47; 714/48; 714/4
(58) Field of Classification Search ................... 714/47, 714/48, 4; 702/183, 182, 185; 710/110, 710/104, 14; 713/1
See application file for complete search history.

(56) References Cited

U.S. PATENT DOCUMENTS 4,965,743 A 10/1990 Malin et al. ................. 364/513

(Continued)

FOREIGN PATENT DOCUMENTS

EP 0416732 A 3/1991

(Continued)

*Primary Examiner*—Robert Beausoliel
*Assistant Examiner*—Marc Duncan
(74) *Attorney, Agent, or Firm*—Verrill Dana, LLP; Chris A. Caseiro

(57) ABSTRACT

A hierarchical, distributed Availability Management (AM) process for recovering from component failures in a data processing system. The hierarchy of AM elements track a failure modality hierarchy of the data processing system components. For example, the system hierarchy may include system cards, processors, and processes, in which case the associated AM elements may be implemented at a card manager (CM) level, a system manager (SM) level, and a process manager (PM) level. The AM hierarchy is designed to achieve a failure granularity so that failures in the lower levels of the hierarchy have less of an impact on the entire system. Each AM element is responsible for receiving failure notifications from processing system components associated with a next lower level of the hierarchy. Upon such indication, if the AM element determines that the failed component may be restarted, if the failed component may be restarted, the AM element then determines if it can be hot, warm, or cold restarted and it does so without further notification or implication to system availability of other components. Hot restart requires complete integrity of sate information, warm restart causes a recovery of last known good state information, and a cold restart results in the re-initialization of state information. If, the component cannot be restarted, then notification is provided to the next higher level of the hierarchy and the AM element itself terminates. One of the AM processes may execute as an identity management protocol. The identity protocol sets a temporary master state; waits a predetermined amount of time; and then sets a final master state only if no other system card has asserted a temporary master state. The waiting time period is selected to be greater than the longest expected initialization process for peer components in the system.

91 Claims, 12 Drawing Sheets

U.S. PATENT DOCUMENTS

| | | |
|---|---|---|
| 5,487,131 A | 1/1996 | Kassatly et al. ............... 395/62 |
| 5,740,357 A | 4/1998 | Gardiner et al. |
| 5,796,990 A | 8/1998 | Erle et al. ................... 395/500 |
| 5,828,867 A | 10/1998 | Pennell ....................... 395/500 |
| 5,917,731 A | 6/1999 | Ferenczi et al. ............ 364/578 |
| 6,058,387 A | 5/2000 | Campbell et al. ............. 706/60 |
| 6,178,445 B1* | 1/2001 | Dawkins et al. ............ 709/209 |
| 6,249,755 B1 | 6/2001 | Yemini et al. .............. 702/183 |
| 6,675,242 B2* | 1/2004 | Benson et al. .............. 710/104 |
| 6,718,481 B1* | 4/2004 | Fair ............................... 714/4 |
| 6,718,486 B1* | 4/2004 | Roselli et al. ................ 714/41 |
| 6,854,069 B2* | 2/2005 | Kampe et al. ................. 714/4 |
| 6,883,170 B1* | 4/2005 | Garcia .......................... 718/1 |
| 2003/0196141 A1* | 10/2003 | Shaw ......................... 714/27 |

FOREIGN PATENT DOCUMENTS

| | | |
|---|---|---|
| EP | 0953911 A | 11/1999 |
| WO | WO9707638 A | 2/1997 |

* cited by examiner

TRANSITIONS

I => P (more than one cpu card is present)

I => C (only one cpu card is present)

P => C (the Pause State duration expired)

C => I (temporary/committed identity conflict encountered)

C => W (identity committed to master-write register)

W => W (wait for event)

| BIT FIELD | R/W | DEFAULT | FUNCTION |
|---|---|---|---|
| 0 | R/W | 0 | SC MASTER STATE |
| 31:2 | R/W | 0x0000000 | RESERVED |

| BIT FIELD | R/W | DEFAULT | FUNCTION |
|---|---|---|---|
| 0 | R | 0 | SC0 PRESENT |
| 1 | R | 0 | SC1 PRESENT |
| n | R | 0 | SCn PRESENT |
| 31:n+1 | R | 0x0000000 | RESERVED |

| BIT FIELD | HOST R/W | DEFAULT | FUNCTION |
|---|---|---|---|
| 7:0 | R/W | 0x00 | SOFTWARE SPECIFIED |
| 31:8 | R | 0x000000 | RESERVED |

| BIT FIELD | HOST R/W | DEFAULT | FUNCTION |
|---|---|---|---|
| 7:0 | R | 0x00 | RSC AM STATE (SOFTWARE SPECIFIED) |
| 31:8 | R | 0x00000 | RESERVED |

| BIT FIELD | HOST R/W | DEFAULT | FUNCTION |
|---|---|---|---|
| 0 | W/R | 0x0 | AM RECEIVE DATA INTERRUPT |
| 1 | R | 0x00000 | AM RESET INTERRUPT (RSC HAS BEEN RESET) |
| 2 | R | 0x00000 | AAM SLOT CHANGE INTERRUPT (RSC INSERTED OR EXTRACTED) |
| 31:8 | R | 0x0000000 | RESERVED |

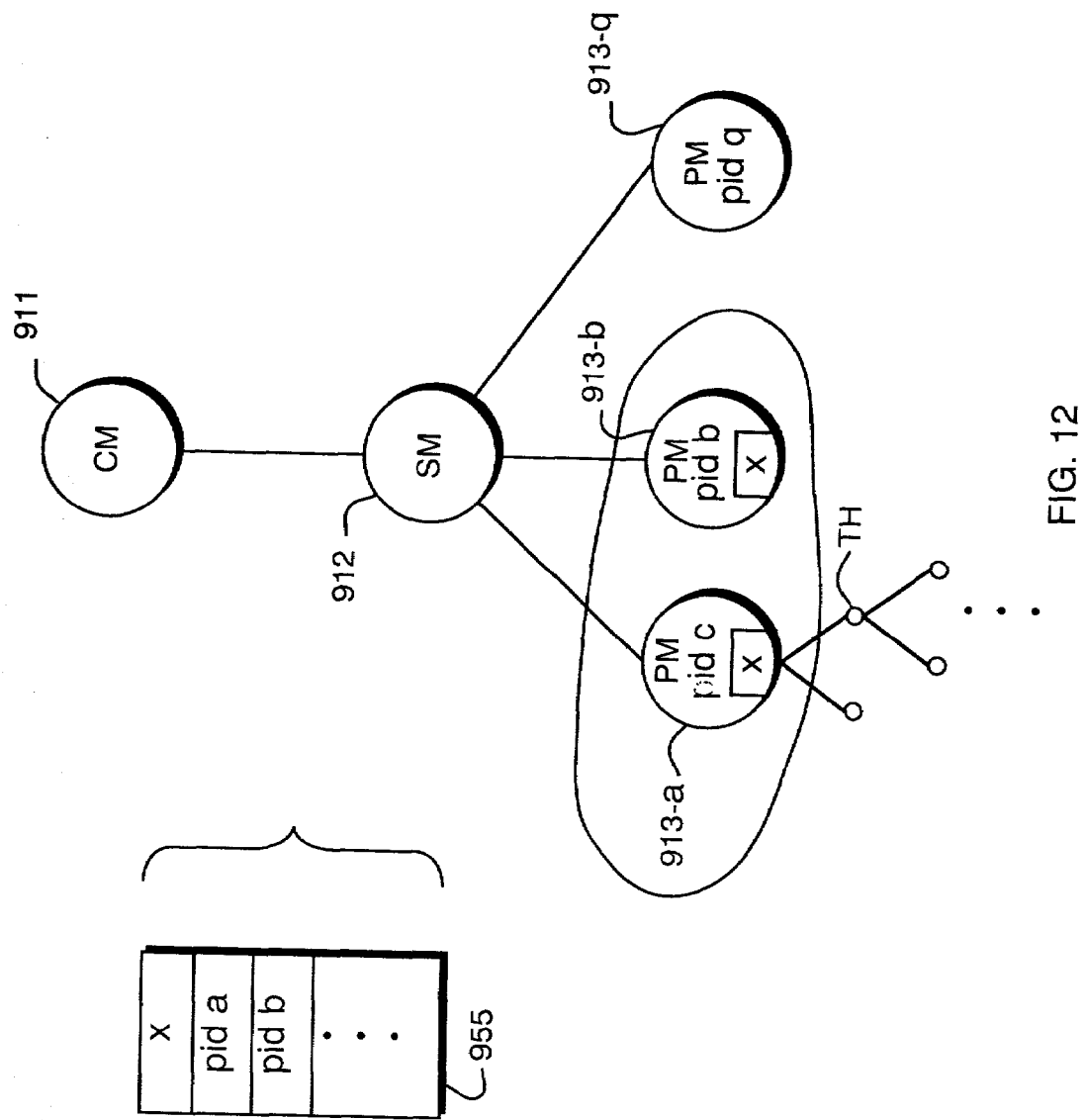

SYSTEM RESOURCE AVAILABILITY MANAGER

RELATED APPLICATION(S)

This application claims the benefit of U.S. Provisional Application No. 60/233,395, filed Sep. 18, 2000, entitled "System High Availability Manager," and is a Continuation-in-Part of U.S. patent application Ser. No. 09/954,471 filed Sep. 17, 2001 entitled "System Resource Availability Manager," the entire contents of which are incorporated herein by reference.

BACKGROUND OF THE INVENTION

With the development of cost effective data communications network infrastructures, such as IP-based data networks, it is increasingly common for such infrastructures to support mission critical data processing applications. So-called high availability computing systems originally developed for deployment in applications such as military, aircraft navigation, and telephone central office uses are now requirements in new deployments of these data communications networks. High availability is commonly achieved with redundant components such as redundant processors where failure modes result in a fail-over to a redundant component. High availability can also be achieved by rapidly recovering the failed components. Fast recovery of routing information in failure scenarios in network systems is important due to the relatively long time it takes to regenerate this information in large and complex networks.

The most stringent requirements for high availability demand continuous service with absolutely no loss of application state. These systems attempt to maintain a log of all transactions and their history; they are considered the domain of so-called fault tolerant computing. These computers often add redundancy to an extreme level as power supplies, hardened storage sub-systems, hardware subjected to stringent Mean Time Between Failure (MTBF) testing, and the like. Continuous availability, both during equipment failure and during subsequent return to service of repaired equipment, comes with a significant price and performance penalty.

High availability computing as presently practiced attempts to utilize the resources of redundant architectures. This solution can address the redundancy needed for components of systems, such as a networking device such as router, switch, or a bridge that is expected to serve a mission critical role in assuring that, for example, connections to many computers are maintained to the Internet. However, the class of errors typically detected in such systems is less comprehensive and the time to recover from such errors is typically much longer than in a true fault-tolerant machine architecture. As a result these architectures, even when they provide for fault recovery only after tens or hundreds of seconds, can be deployed for often at much less than the cost of traditional fault-tolerant computing systems.

The most often configuration is a so-called dual redundant architecture in which two data processing systems are deployed as an active-standby or master/non-master states. Hardware and/or software fail-over processes can be triggered by hardware, or software detectors, to cause an active or master process to be transferred to another active master process without operator intervention. Such application program fail-over typically requires that applications be restarted from the beginning, however, with the loss of all processing state not already committed to the secondary storage device such as a disk.

In an application such as a networking device, actively restarting the application in a functional processing node typically assumes the responsibility for reassigning, for example, the network addresses of the failed machine to the new processor, as well as rebuilding critical information such as routing tables. The transfer of network address and connection information can be typically handled quite easily and without complication.

As the size and complexity of data network increases, a router located deep within a network may have received its state information and constructed its routing table over the course of time. If router table state information is lost, it can be cumbersome and time-consuming to restart a router process and rebuild a router table. The information can only be restored by sending a long series of query and advertisement commands through routing protocols, such as an Interior Gateway Protocol (IGP) or an Exterior Gateway Protocol such as BGP-4. Upon the restart, it may thus take many seconds or even minutes, for router protocols to completely rebuild such tables.

Even more severe situations can occur where the rebuilding of the router table is not completed before real-time topology changes in the surrounding network occur. In such instances, the protocols may continuously reset themselves, thereby ultimately creating a race condition in that the process for rebuilding the router table never completes without some sort of manual intervention.

It desirable therefore for such systems to adopt certain high availability architectures, such as providing dual or backup power supplies, dual and separate system processor cards, and live insertion or "hot swap" capabilities that support replacement failed components without shutting down the entire system.

SUMMARY OF THE INVENTION

The present invention is directed to an Availability Manager (AM) process for controlling the recovery from component failures in a data processing system. The AM process is itself a hierarchical, distributed, loosely-coupled set of process elements that are related to one another in a hierarchy that parallels a hierarchy associated with the failure modalities of the data processing system components. Within each given AM process element, failure notification from a data processing system component is received. If the data processing system component can be restarted by its associated AM process element, then that component is restarted and the AM element continues, with no further impact on system availability. However, if the data processing system component cannot be restarted, the AM element process terminates while providing a termination notice to a next higher level layer of the AM element hierarchy. Component failure notification thus continues up the level of the AM element hierarchy until it either meets a level of the hierarchy that can restart its associated component level, or reaching a highest level of the hierarchy. In the preferred embodiment, the highest level of the hierarchy uses a mechanism such as a watchdog timer or reset circuit that initiates a global system reset procedure.

It should be understood that a number of modifications may be made to this general aspect of the present invention. In particular, the data processing system components are, in general, any sort of data processing component that may perform one or more system functions. The components may, for example, themselves be hardware components such as system circuit boards, processors, or software elements such as application processes, threads, or operating systems, and the like.

The failure notification provided may be a termination notification and/or a process hang notification. In the case of a component termination, the failure notification may carry further information that may permit the associated AM element to make a decision with respect to the ability to restart. For example, the component termination notice may provide component state information indicating whether the components own internal logic has terminated execution in state where the monitored component itself can be restarted without error.

However, underlying components such as operating system components may further provide information to assist the AM element in making a restart decision. For example, the state of operating system entities, such as the state and types of resources that were in use may be monitored by the operating system, along with the state of other data processing system components, and the like. This information may then be forwarded by the operating system to the AM elements so that the AM elements can determine whether a particular component can be restarted.

Component hang states may be detected by using a heartbeat protocol between an interrupting-timer component and an AM element(s) at the same level. In one embodiment, the interrupting-timer handler can periodically send a known signal to the AM element(s) at the same level of the hierarchy. Upon reception of the signal, the AM element updates a location known to the interrupting-timer handler with a value acknowledging receipt of the signal (e.g., incrementing a counter). In this manner, when the interrupting-timer handler notices that an AM element has not updated the well-known location after some predetermined duration, it can be presumed that the respective AM element is hung. In this instance, the interrupting-timer handler will record the identity of the hung element (and possibly other state information that may prove useful for debugging and other purposes) before causing the hung elements termination.

The AM element hierarchy ensures that component failures will be localized to the lowest possible level in the data processing system component hierarchy to which a failure can be isolated. This prevents unnecessary global system restarts which may, in turn, have an adverse affect on system availability as a whole.

Failure notification may be made by signaling in any convenient fashion among the AM elements. In a preferred embodiment, the AM elements execute as processes in a distributed, multi-tasking operating system. In this environment, failure notification is preferably made through the use of inter-process operating system messages or signals.

In a case where the data processing system components include system cards, processors, and application processes, the AM elements may include, respectively, a watchdog timer element, card manager (CM) elements, system manager (SM) elements, and process manager (PM) elements. In this case, where a failure notification is to be begin by a CM element, it suppresses its watchdog time update. Upon this occurring, the watchdog timer expires, therefore causing a reset for all components local to the associated system card.

With redundant components such as system cards, a master state must be determined and upon component failure or removal, a fail-over to the redundant components must occur. In this protocol, a physical default master state may be first assumed in such an approach when the master state is first asserted. However, a transition can be made to a logical default master state if a subsequent read of master state assertions from other components indicates that no other component has asserted the master state. In addition, if any component has a higher priority location with a master state asserted even subsequently, the master state may still be de-asserted and the commitment be made to the non-master state.

A Depart State Machine is executed upon reset command from another peer system component or if, for example, the peer system component departs from the system, such as if a system card is removed from a backplane. The Depart State Machine determines if the departed component was previously asserted the master state and, if so, then the Join State Machine will be executed by the remaining components.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 8A through 8E illustrate certain registers as used for supporting an identity protocol used by an Availability Manager (AM).

FIG. 12 illustrates a child process dependent restart scenario.

DETAILED DESCRIPTION OF A PREFERRED EMBODIMENT

A description of preferred embodiments of the invention follows.

1. Overall System Hardware Architecture

The present invention relates to hardware and software elements of a high Availability Manager (AM) as used in a distributed data processing apparatus. The Availability Manager is responsible for controlling certain dynamic events that can occur in data processing systems that not only contain a multiple Central Processing Unit (CPU) system cards, but also where system cards contain any number of processing units operating in parallel. The processing units typically execute an operating system that is distributed, multi-tasking, and fault tolerant.

The invention seeks to implement the Availability Manager on a hierarchical basis so that domains of related data processing system functionalities and failure modalities. Such domains may include intra-card domains (that is, between processors on the same card), and inter-card domains (that is, elements controlling card-to-card operations). In effect, each domain is aware of whether a mechanism exists for sub-domains that it respectively monitors can be restarted. If they cannot be restarted, then each domain itself terminates, notifying its respective higher-level domain.

The invention also includes both hardware and software processes that perform a card identity process to determine which of a number of redundant cards will assume the role of system master.

Figure 1:
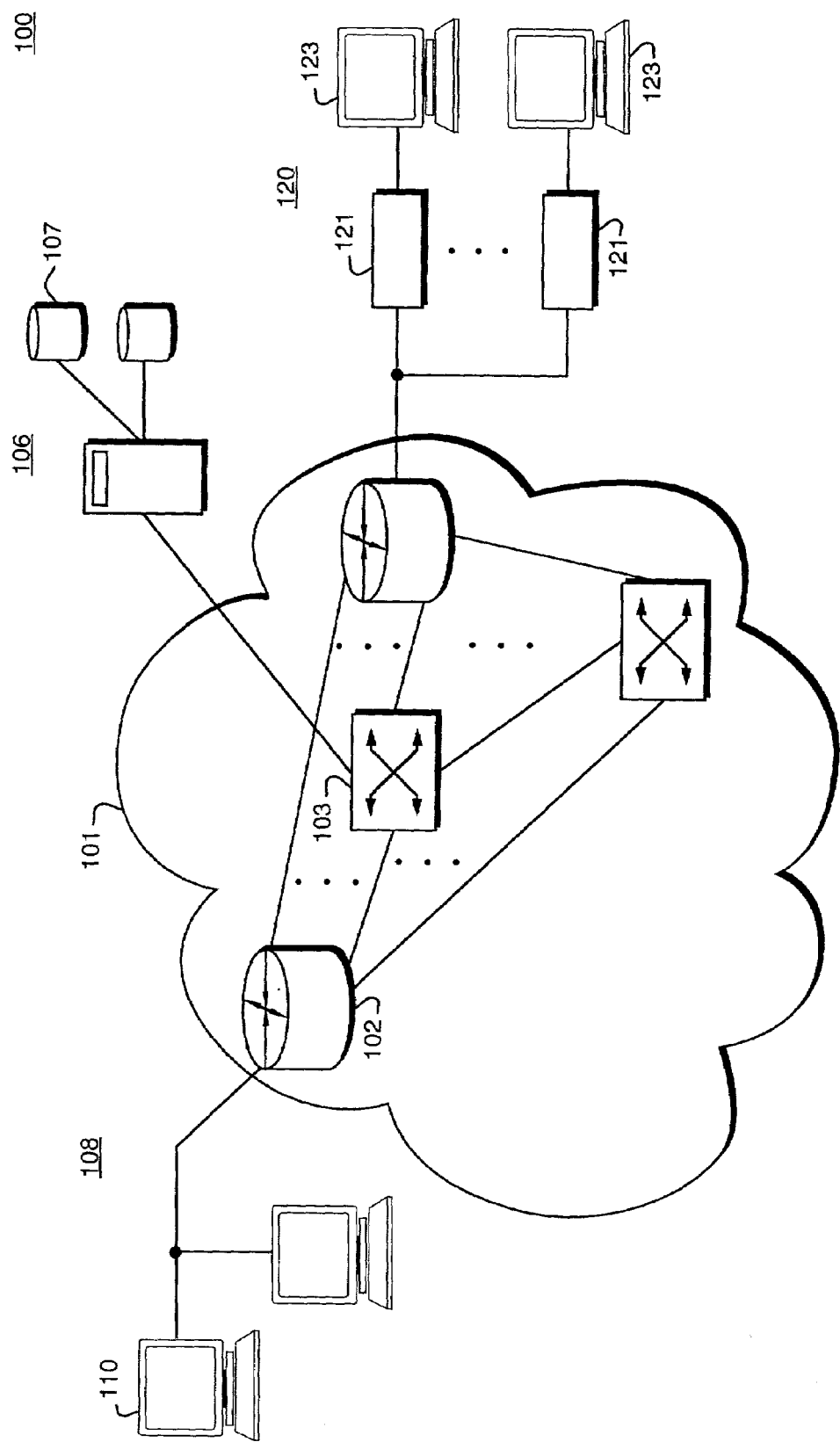
FIG. 1 is a diagram of a data processing system in which devices may make use of the present invention.

The requirement of high availability relates to how quickly a data processing system can recover from a failure condition. This is a particularly acute problem in a system such as networking devices used to implement a computer network 100 such as shown in FIG. 1. The network 100 may, for example, be the Internet 101 and consists of networking devices such as switches 102, routers 103, bridges, gateways. The networking devices 102, 103 are responsible for providing communication connections between various data processing sub-networks and systems. For example, the network 100 may provide connections from a one end node which is a file server 106 that stores a number of network-accessible files on data storage devices 107 so that they are made available to other end nodes like those at local area network 108 that interconnects a number of personal computers (PCs) 100. Likewise, connections may be made to other sorts of sub-networks such as may be located at an Internet Service Provider (ISP) 120 that provides dial-up access through a bank of modems 121 to individual user PCs 123 located in residential homes.

The present invention provides high availability for data processing systems such as the networking devices 102, 103 so that they not only recover from failure conditions as quickly as possible by limiting the propagation of failure notifications. In particular, the invention involves the monitoring of fine grain state information for each domain in a hierarchy of software domains, and stopping failure notification if a domain can be restarted.

Figure 2:
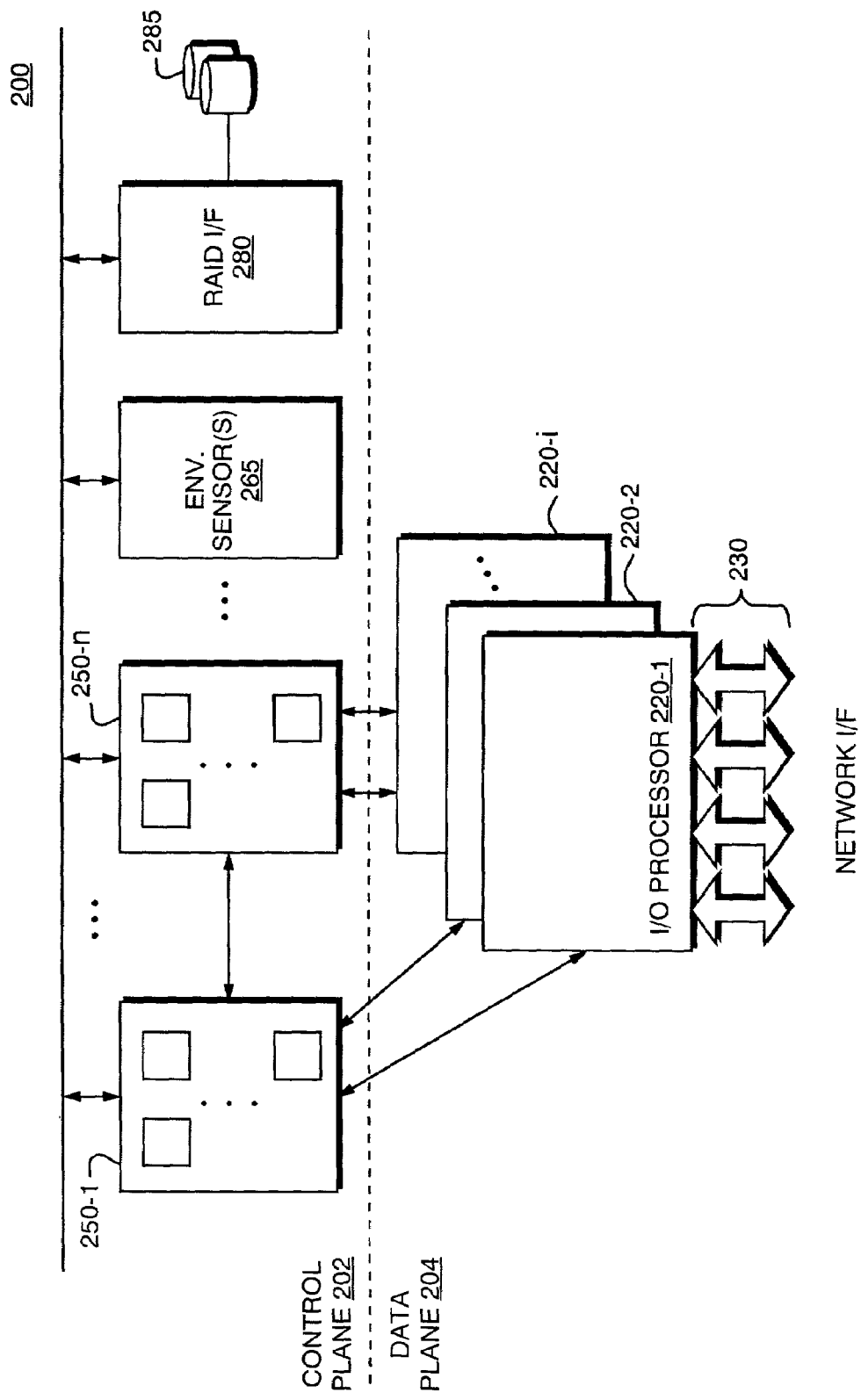
FIG. 2 is a more detailed block diagram of a networking device such as a router that uses the present invention to provide high availability.

FIG. 2 illustrates a more detailed hardware block diagram of one of the exemplary networking devices 200. As is known in the art, a networking device 200 such as a router 102 or a switch 103 consists of elements associated with a control plane function 202 and data plane function 204. Generally speaking, the data plane 204 is responsible for moving payload information; that is, for forwarding the actual data packets that are expected to be forwarded between the end nodes in the network 100. The control plane 202 is responsible for controlling the operation and configuration and maintenance of the data plane elements 204, and specifically, establishing and maintaining routing and forwarding tables that represent the interconnection topology of the routers 102 and switches 103 that comprise the network 100.

More particularly, the data plane 204 typically consists of a number of input/output (I/O) processors 220-1, 220-2, . . . , 220-i. The I/O processors 220 are each responsible for performing the core operations upon payload data that is received through networking interfaces 230. For example, in an instance where the networking device 200 is a router, each I/O processor 220 is responsible for receiving data packets from one or more of the network interfaces 230, examining destination address field and ingress port information, and performing a lookup in an associated routing table. The routing table returns information such as an egress port number, on which to forward the packet. The forwarding may be within a single I/O processor 220 or among the group of I/O processors 220 associated with a particular networking device 200.

The control plane 202 is the focus of the implementation of the present invention. In particular, the control plane 202 consists of one or more (typically, at least two) central processing unit system cards 250-1, . . . , 250-n (referred to herein as CPU cards and/or system cards (SCs)), as well as one or more timers 260, user interface circuitry 270, and data storage interfaces 280.

Each of the SCs 250 may have a plurality of processors 252 located on it.

Each SC 250 has one or more timers 260. As will be understood shortly, at least one of the timers 260 is a so-called watchdog timer used in the present invention to coordinate operations of highest instantiation of the hierarchy.

Environmental sensors 265 can be utilized to provide signals to the SCs 250 indicating temperature, voltage, fan state, and other environment conditions. The sensors 265 may provide signals indicating fault conditions to other components of the system.

The disk interface 280 provides access to a non-volatile storage device such as a Redundant Array of Independent Disks (RAID) 285, or other non-volatile, persistent secondary storage system.

2. Master Identification Protocol

The Availability Manager (AM) makes use of both hardware and software elements to manage certain dynamic events that can occur in the device 200. Of initial interest are certain configuration sequences and information that are used to ensure a situation where only one of the SCs 250 is designated as a master at any point in time. The designated master card inherits responsibilities that distinguish it from the other cards in the systems but it is otherwise identical in its implementation and configuration.

Certain dynamic events that are deterministically handled by the Availability Manager include:
  master v. non-master identity selection (Join State Machine)
  non-master to master identity transition (Depart State Machine)

Figure 3:
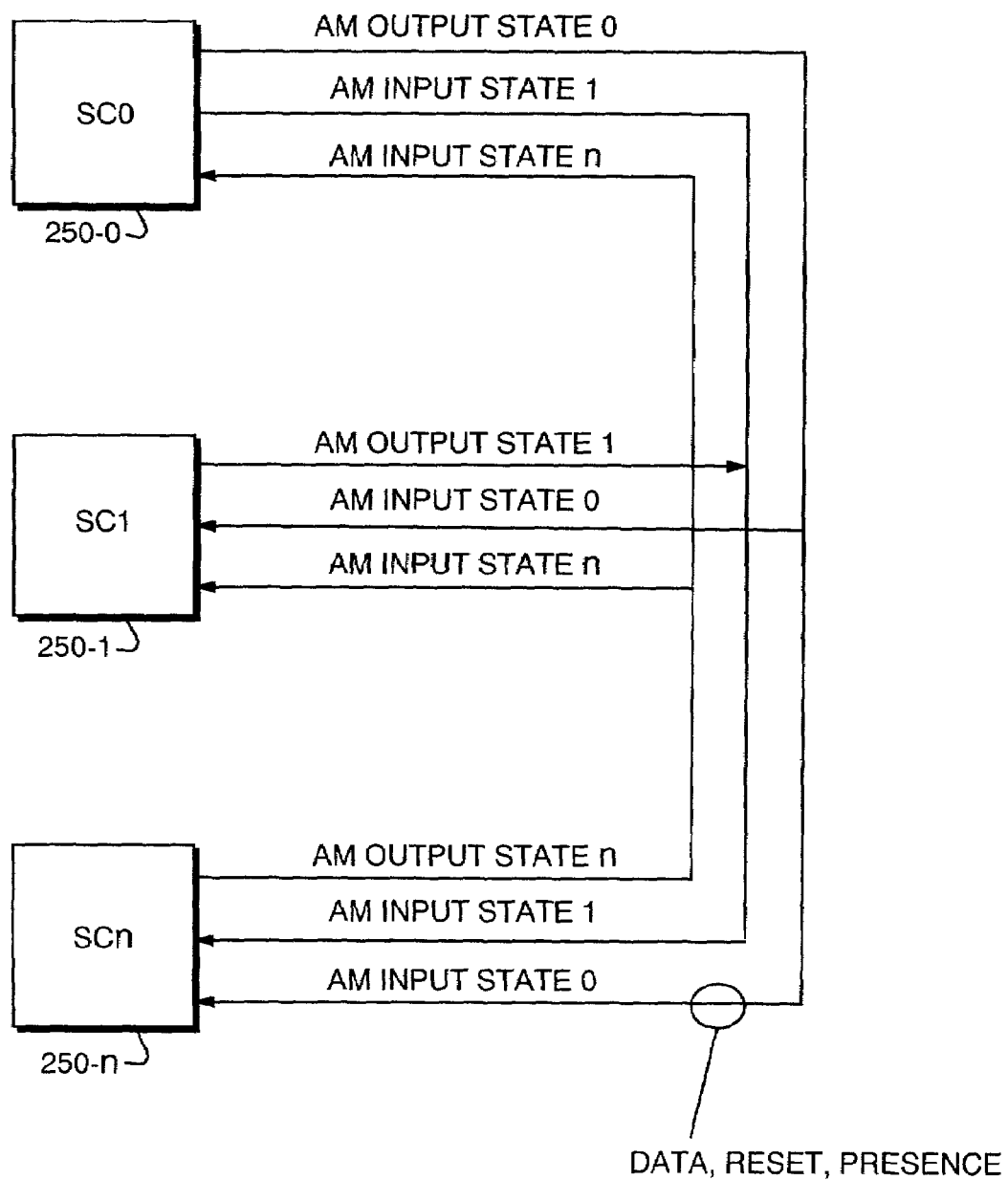
FIG. 3 is an interconnect diagram for system cards.

An interconnected mesh interface is needed between all SCs in order to convey state from a given SC 250 to all other SCs 250. As shown in FIG. 3, a first SC0 connects to a write bus to the other system cards SC1, . . . , SCn. In a system in which there are only two SCs 250, the write bus from SC0 connects to the read bus of SC1 and the write bus from the SC1 connects to the read bus SC0. The write bus and read bus are implemented as an asynchronous bus interface in the preferred embodiment. The interface may consist of an address, an 8 bit data bus, and control signals.

The mesh interface described in FIG. 3 may include a mechanism such as a shared data bus that may or may not be redundant. Various physical architectures may be used to implement the bus such as point-to-point, parallel bus, mesh network, redundant bit lines, and so forth. What is important is that the bus is fully connected such that each system card 250 can both read and write information from and to the other system cards 250.

As will be understood shortly, each of the system cards 250 also have associated with them write registers, read registers, and register logic circuits that permits the conveying of state information among the various cards. From a software perspective, the needed hardware thus consists of a set of registers and interrupt lines associated with each of the system cards 250.

The registers include at least those shown in FIGS. 8A through 8E as follows.

Slot Identity Register—Indicates the backplane slot position of the associated system card.

Slot Presence Register—Indicates which backplane slot positions are currently occupied and unoccupied by other system cards.

Master Read Register—Indicates which system cards have assumed the master identity. Note this register is cleared to the all zero state at a power-on, slot insertion, or reset operation. Individual bits in this register are set to zero if and when a corresponding system card resets its state or is pulled from its associated slot in a backplane.

Master Write Register—Updated with a value of one when the local system card wants to assume the master identity. A side affect of updating this register is that all other system cards are interrupted with a master write interrupt signal.

Reset Register—Resets the local system card and generates a reset interrupt to all other system cards when updated with a value of one.

Interrupt Status Register—Indicates which interrupts are currently pending; that is, require servicing. There are three possible sources of interrupts, a system card removal insertion event, a system card reset event, and updates to the master write register.

The Identification Protocol software executes as a state machine on at least one of the processors on each SC 250. The two state machines include a Join State Machine (JSM) and Depart State Machine (DSM). The two state machines respectively are executed upon the joining of a system card (at a power-on or after reset event) and upon the departing of a system card (i.e., upon its termination). The two state machines are preferably run synchronously, but are bounded with respect to their completion times.

Join State Machine (JSM)

The JSM is executed by an SC 250 at a power-on or after reset event in order to determine which system card should be designated as a master. The JSM is based upon the concept of designating a default master. The default master can be, for example, an SC 250 that currently occupies a designated backplane slot. For example, the system card with the lowest address (where zero is the lowest numbered address slot) can be used as a default master. As will be understood shortly, the adoption of a default master rule eliminates the possibility of a tie where two or more system cards attempt to be a default master and attempt to assume the master role at the same time.

There are also two types of default masters in the overall system, including physical and logical. A Physical Default Master (PDM) is the system card that currently occupies the lowest physical slot in the backplane and is always singular. A Logical Default Master (LDM) can be any system level card other than the physically lowest. Multiple LDMs can exist simultaneously (although this condition will exist only for a very brief period of time).

Figure 4:
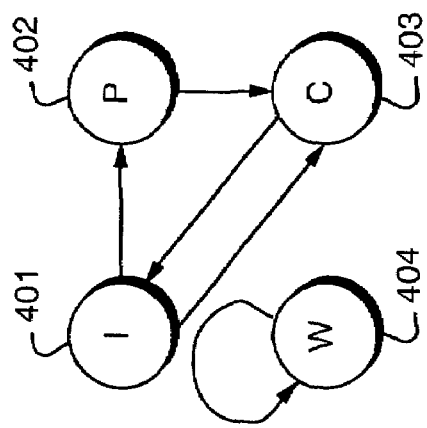
FIG. 4 is a state diagram for a Join State Machine.

A sequence of states to implement the join state machine with the above constraints is shown in FIG. 4. This state machine has four states, including an initializing state, (I)401, a paused state, (P)402, a commit state, (C)403, and a wait state, (W)404. A summary of the transitions of the state diagram in FIG. 4 is shown next to the diagram. In particular, state I may transition to state P when more than one system card is present. State I transitions to state C when only one system card is present. State P transitions to state C when the pause state duration has expired. State C transitions back to state I when a temporarily committed identity conflict is discovered. State C, however, will transition to a wait state when its identity has been committed to the master write register. The wait state W then just continues until some other event occurs, causing it to be removed from the state, such as if another system card 250 is removed from the backplane or if such another system card 250 fails.

The initializing state I is responsible for performing the following functions:

Determine the backplane slot position such as, for example, reading the slot identity register.

Determine if this particular system card is the default master such as by reading the slot presence register 802.

Temporarily update the master write register 803 with either a master or non-master identity, depending upon the contents of the slot presence register.

Thus, a system card located in the lowest numbered active slot can read the slot presence register. If bit field zero is not set, it will conclude that there is no system card 250 in slot zero; therefore, it must assume responsibility as default master even though it is not in the slot zero position.

From the initialization state 401, if more than one system card is present, such as may be determined by reading the slot presence register, then processing transfers to state 402. If, however, only one SC 250 is present, then the state transitions to the commit state 403.

In an instance where more than one system card is present, the pause state (P) 402 is necessary. This ensures that master write register updates are atomic. Since the system lacks an inter-card test and set primitive instruction, time delays instead are used to guarantee atomicity.

Figure 5:
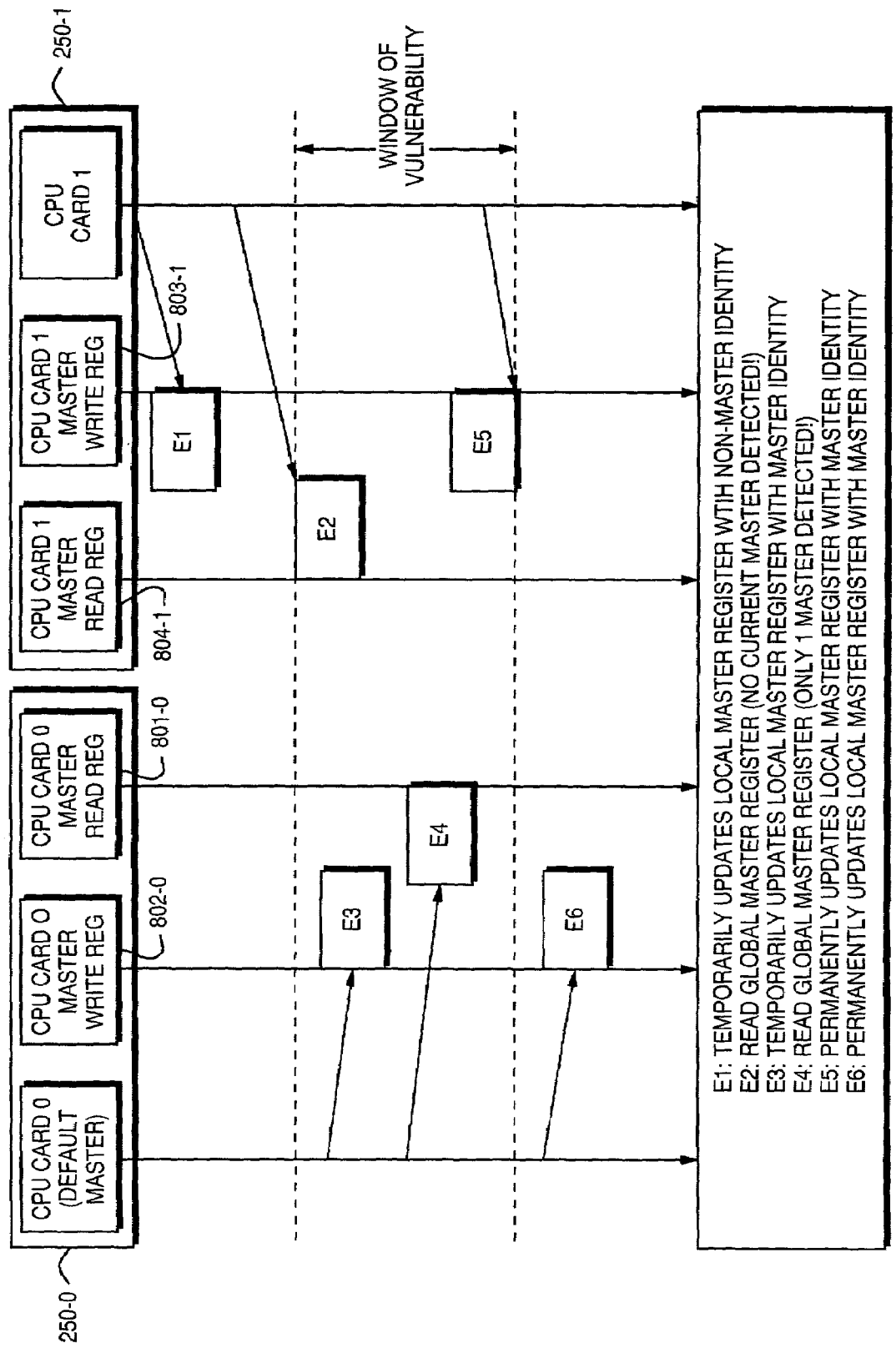
FIG. 5 is a diagram illustrating how signals pass between two central processing unit (CPU) system cards.

The particular race condition which the pause state (P) 402 attempts to eliminate is shown in FIG. 5. Consider a case where there are at least two system cards 250-0 and 250-1. Each of the system cards 250 has its associated master write register 803 and master read register 804. The vertical axis in FIG. 5 illustrates time, and a particular period of time referred to herein as the "window of vulnerability" in which a particular race condition may be created.

From an initial time, E1, system card 250-1 temporarily updates its local master write register 804-1 with the non-master identity. This is because system card 250-1 will have been installed in slot one and detect the presence of another system card in a lower numbered slot zero.

At a time E2, the system card 250-1 reads its global master register and determines that no current master has been actually assigned.

At a next point in time, E3, the system card 250-0 occupying the lowest numbered slot temporarily updates its local write register 803-0 with the master identity. At time E4, it then reads the global master register, detecting that only one master has been assigned in the system. At time E5, the system card 250-1 will update its local master register with the master identity assigned from the global master register. At time E6, the system card 250-0 permanently updates its local master register with the master identity. Thus, it is possible for two or more system cards 250 to assume the master identity for a particular period of time.

Figure 6:
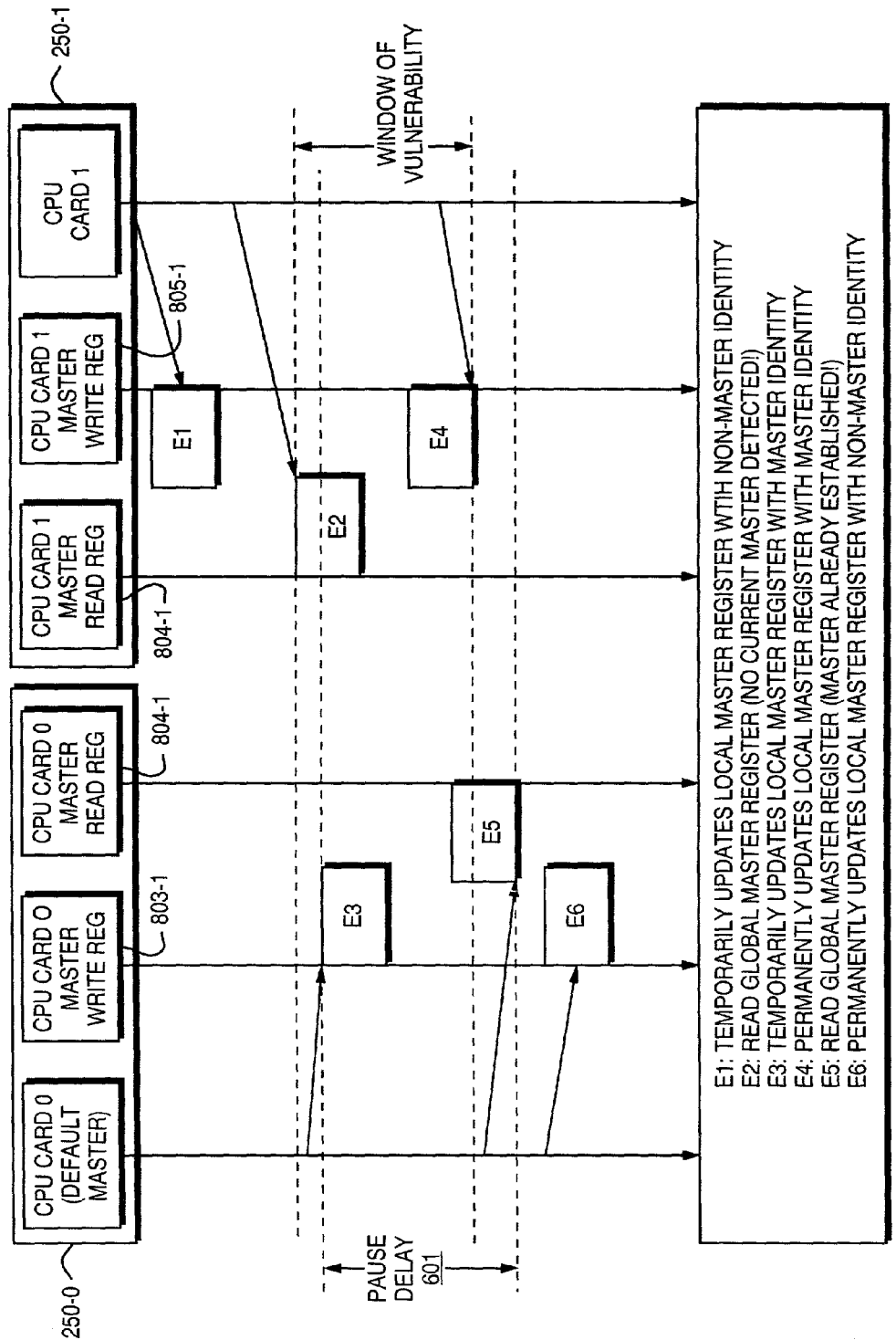
FIG. 6 is a diagram illustrating how a window of vulnerability may be shifted.

This window is closed, however, if it is required that a system card 250 must pause, that is, enter state P (FIG. 4), after it temporarily updates its master write register 803. The pause time should be larger than the time represented by the window of vulnerability. When the pause state is inserted, the state diagram of FIG. 5 is changed to that shown in FIG. 6.

In this scenario, as previously at time E1, system card 250-1 updates its local master write register with a non-master identity. As before, at time E2, the global master register is read with no current master being detected by with mo current master being detected at this time by system card 250-1. At time E3, system card 250-0 temporarily updates its local master register with the master identity (as it did previously in FIG. 5). However, at time E4, system card 250-1 permanently updates its local master register with the master identity. In affect, the pause period has forced the system card 250-1 to wait until time E5 to read the global master register. When that time, i.e., the pause delay 601 finally expires and the global master register is read, the proper master will have been established.

At time E6, therefore, when the system card 250-0 attempts to permanently update its local master register with the non-master identity, only one master has been identified.

The card occupying the lowest slot is thus the default master and it is the only card allowed to assume master identity during a temporary identity phase of the identity protocol (i.e., it asserts the master identity initially, but downgrades to non-master when a conflict occurs at the commit C state). The trivial case occurs when the protocol elects the default master to be the committed master (i.e., the protocol completes in a Physical Default Master (PDM) mode. The complex case occurs when the protocol fails to elect the default master in PDM mode forcing the protocol to transition to a Logical Default Master (LDM) mode.

In LDM mode, it is possible for more than one card to become the committed master (e.g., if system cards 250 in slots 1, 2, and 3 are running the identity protocol in lock-step, all will commit to become master in the critical region). Multiple committed masters create ties—but ties are broken by the protocol in LDM mode. In particular, upon exit of the critical region (i.e., the bounded read-modify-write sequence), if any card in a higher numbered slot is also a committed master, then it downgrades itself to the non-master identity. Correctness (i.e., only one master will ever exist before any layer above the identity determination layer is informed of their identity) requires all cards to look towards the higher numbered slots because the physical default master will unconditionally assert master identity during its temporary identity phase. Since downgrades are performed lazily (or unbounded) in the LDM mode, if a card looked towards lower numbered slots, it may catch the lowest slot card asserting its temporary master identity and perceive it as committed. Then, if the higher slot card failed to downgrade before the lowest slot card completed its critical region (i.e., lowest slot card sees another master exists and downgrades to standby status), the result would be a system with not elected master.

Correctness of the LDM phase (that is, ensuring that only one master exists when complete) requires each participant pause for a duration greater than or equal to the duration defining the length of the vulnerability window. This post critical region delay closes all timing windows where it is possible for two or more cards to become master. The post critical region delay guarantees that any card occupying a higher slot than the card currently executing the LDM phase identity protocol will (1) cause the higher slot card to leave the critical region committed to standby identity, or (2) cause the lower slot card to downgrade its identity to standby.

Returning attention to FIG. 4, the commit state 403 is a state that marks the time when it is permitted for system card 250 to read the global master register, i.e., the master read register 804. Based upon its contents, that system card 250 can then commit to assuming either the master or non-master role. The local master register (master write register) may also have to be updated at this point if the temporary identity conflicts with the committed identity. A "conflict" is defined as the occurrence of two or more enabled master assertion bits in the master read register.

When the temporary and committed identities conflict, the commit state transitions certain default master nodes. In particular, a Physical Default Master (PDM) mode is the mode in which the commit state always starts. In the PDM mode, all system cards 250, except the one in the lowest occupied slot, temporarily update their associated master write register 803 to indicate a non-master identity. The card remains in this PDM mode, if, after reading the master read register 804, at least one other card has asserted its intention to be master.

The commit state 403 transitions to a Logical Default Master (LDM) mode if the contents of the master read register 804 is all zeros (i.e., no other card has asserted its intention to be master). In LDM mode, the system card 250 behaves as if it occupies the lowest physical slot (that is, it temporarily asserts its intention to become the master after transitioning back to the initialization state I). When the system card 250 returns to the commit state 403 and reads the master read register again, a rule is respected so that any ties can be broken in a race-free manner. The rule is that if any system card 250 occupying a higher slot has its master bit asserted, then it must de-assert its own master bit and commit to being a non-master.

Depart State Machine (DSM)

The depart state machine is executed by a system card 250 as a result of receiving a reset command or a slot removal insertion interrupt. One particular example of a reset command generated by the software elements of an Availability Manager will be described below in greater detail in connection with FIGS. 9 through 11.

In the event that any of these events, a new master system card must be determined. It should be understood that the correctness of the DSM state depends upon the Availability Manager being able to clear the bit corresponding to the departed system card in the global master read register so that the other cards may properly determine the state of the system cards.

Figure 7:
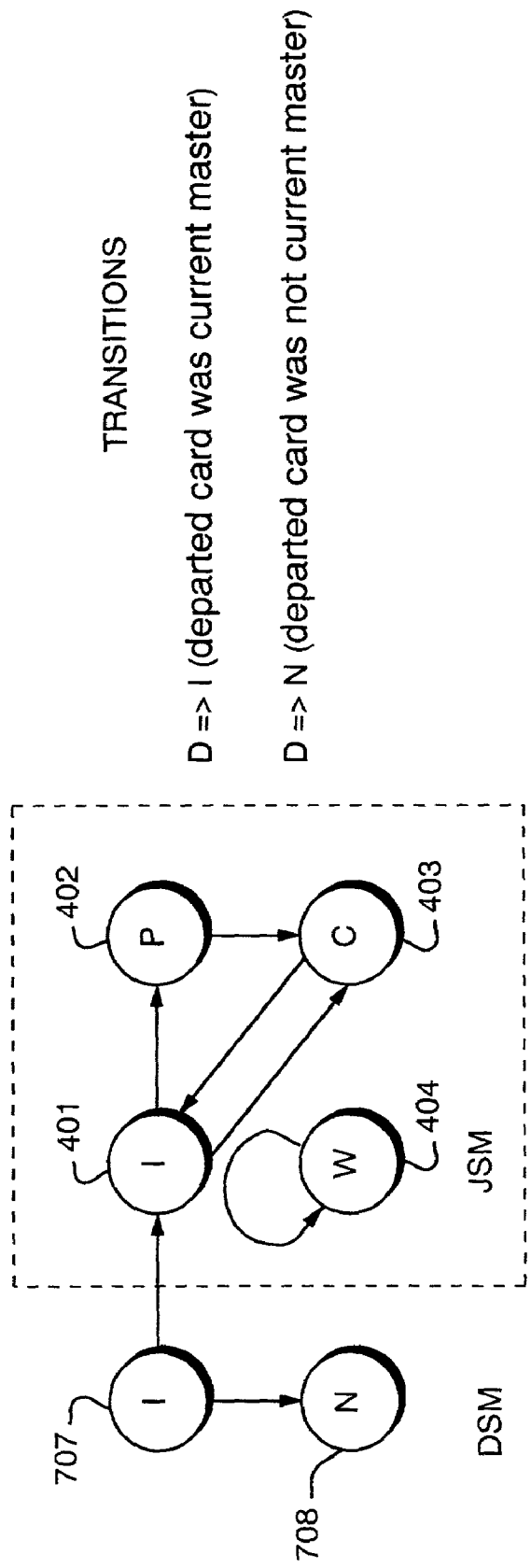
FIG. 7 is a state diagram for a Depart State Machine.

A state diagram for the depart state machine is shown in FIG. 7. It adds states 707, which is a determine state, and state 708, which is a no-action state.

The determine state 707 has a responsibility for determining if the departed system card 250 was a current master such as by reading the master read register. If this is the case, then the JSM state machine should be executed.

If the no-action state 708 is entered, then the departed card was not the current master and the depart state machine will take no further action.

State transitions for the DSM thus include transitioning from state D to state I if the departed card was the master, and transitioning from state D to state N if the departed card was not the current master.

As has been mentioned above, an Availability Manager-based system will contain at least two or more system cards (SCs) 250. Each SC 250 has one of two states, master or inactive. An SC 250 in the master state defines that system card 250 as the system's active processing circuit board. An SC 250 in the inactive state defines that SC 250 as assuming a "hot standby" status.

Hardware in the monitor detects the master state provided from each SC 250 to determine which SC 250 to communicate with. By design, one and only one SC 250 can be in the master state with the other SCs in the inactive state at any period in time.

It is possible to have the responsibility for determining, asserting, and maintaining master/inactive C state in software. It is preferable, however, for hardware to be responsible for sending and receiving the data and state information between the SCs 250. Data traffic can be initiated by software, however, with the hardware being responsible for informing the software via interops of global SC state changes.

Per system card hardware support elements consist of a dedicated bus which passes state information between the system cards as is shown in FIG. 3. The write portion of the bus allows an SC 250 to sends its state information to all other SCs referred to here as the redundant system cards (RSCs). The read portion of the bus functions of the bus allow an SC to receive or monitor RSC state information. Thus, for example, a given card, SC1, may receive input state information line 0 from SC0 and input state information line n from SCn. Likewise, given system card SC1 may output state information on the output state 1 portion of the bus. Software transmits state information by routing to a register known as the Availability Manager write register.

Interrupt support is provided such as by including a received RSC reset, RSC read register update signal such as by the RSC issuing an AM write command, or an RSC slot change. Each of these three asynchronous messages generates an interrupt on a system card; each RSC also resets the RSC master read register.

A real-time clock watchdog timer is reserved for use by other software elements. As will be described in further detail below, a system card 250 can be reset upon the occurrence of a watchdog time out event.

The hardware registers needed to support the Availability Manager are shown in FIGS. 8A through 8E.

The system card master register 801 shown in FIG. 8A specifies system card master state sent to all target boards in the system. Writing a logical 1 to the SC master state bit places the system card in the "master" mode. If this bit is set to zero, then the associated system card 250 is not in the master mode, i.e., it has a non-master identity. Each system card 250 has its own respective master system card master register 801.

The system card slot presence register 802 indicates the presence of every system card 250. This register, also present on each system card 250, thus has a bit associated with each possible backplane slot. A bit is asserted if its respective associated system card is inserted.

The AM master write register 803 is used to transmit state information to the RSCs. That is, a write to the AM master write register in a particular system card 250 causes that system card to issue a write command via the bus to all the other RSCs. This is accomplished in the preferred embodiment by having the AM write register generate a read interrupt to other RSCs. The RSC hardware receives the interrupt; software on each RSC then reads its respective AM read register 804. The values of the bit fields can be specified in software, as has been described above.

The AM master read register 804 contains received Availability Manager status from the other RSCs. This register is updated upon the issuance by an RSC of a write to the write bus. The AM master read register 804 is a read-only register, from the perspective of the associated system card.

The interrupt status register 805 contains a number of fields identifying interrupt causes. For example, these causes may include the reset of an RSC, a read register update from an RSC, or an RSC slot change, that is, an RSC board has been inserted or removed. Note that the bits 2:0 are replicated for each SC 250. Any interrupt bit asserted in this register generates a dedicated Availability Manager interrupt to the software level of the associated card. Typical Availability Manager information exchange consists of heartbeat signals and state changes as will be described below, such as heartbeats and process terminations.

One aspect of the present invention is therefore a method for providing high availability in a multiprocessor system by designating a master where the processors themselves do not have inter-processor test and set primitive instructions. In particular, a relative position in physical space is determined for a designated component with respect to its physical position as compared to other processors in this system. It is then determined if the relative position corresponds to a predetermined physical position associated with the physical default master. If it does, the designated component becomes the master. If it does not, the component assumes a non-master state. The contents of a global master register are then updated to indicate whether the designated processor is the default physical master. If the component is to assume the master state, it first needs a period of time, or pauses, based upon a window of vulnerability. This window of vulnerability pause ensures that a possible race condition among the processor is avoided in assigning the default master state. The contents of the global master register are then read after the end of the pause period to permit either assuming a physical master role or the physical non-master role. Finally, if the global master register, once read, indicates that no processor has assumed the master role, then a default logical master role will finally be assumed.

3. Hierarchical, Loosely-Coupled Availability Manager

The Availability Manager also includes a monitoring component running in each of the processors 252 associated with each system card 250. The monitoring aspect of the Availability Manager is used primarily to eliminate unnecessary assertion of a system card reset state. A system card reset is undesirable because it may cause a significant disruption to availability due to its high position in a hierarchy. In particular, data processing system components are considered to be arranged in a hierarchy. At a given element of the hierarchy, a mechanism exists for determining if the components at the current level of the hierarchy are presently active. If the processing components at the current level of the hierarchy terminate, hang, or enter another non-deterministic undesirable state, the mechanism detects this event and when necessary causes the components termination. When a component in the Availability Manager in the next layer above receives the termination signal, it determines if the component can be restarted. If the component can be restarted, the AM element initiates restart of just that component. However, if the component cannot be restarted, the present level of the AM hierarchy will terminate itself thereby causing a termination signal to be sent to the AM layer above.

Active failure notification can be implemented by having a software element send out a signal when it terminates. In addition, other system components can be classified in domains according to the severity of the failures that they can trigger. The severity indication can determine whether the component can be restarted or whether it is the system that must be restarted.

Figure 9:
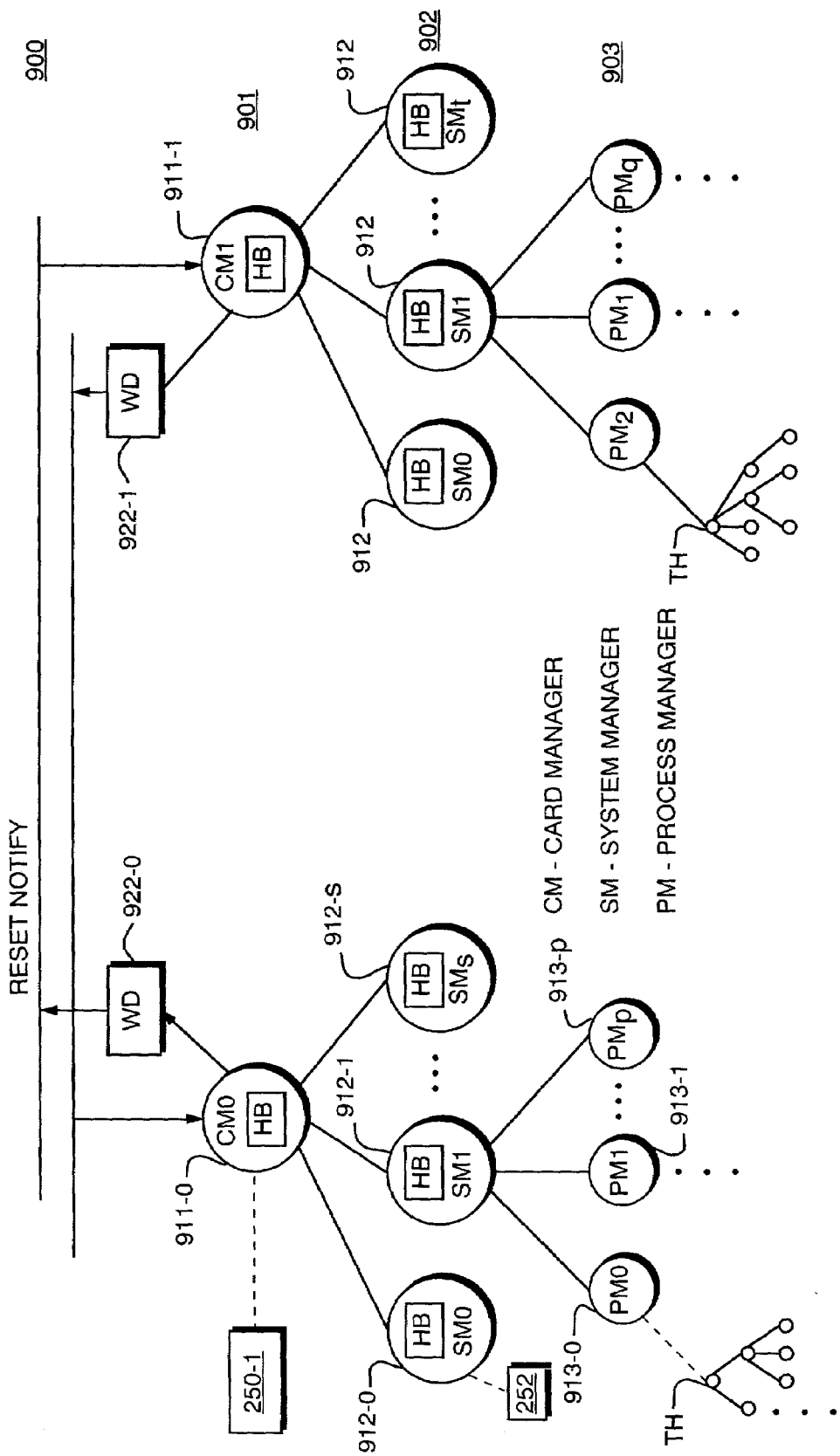
FIG. 9 is a software hierarchy diagram for the AM.
Figure 10:
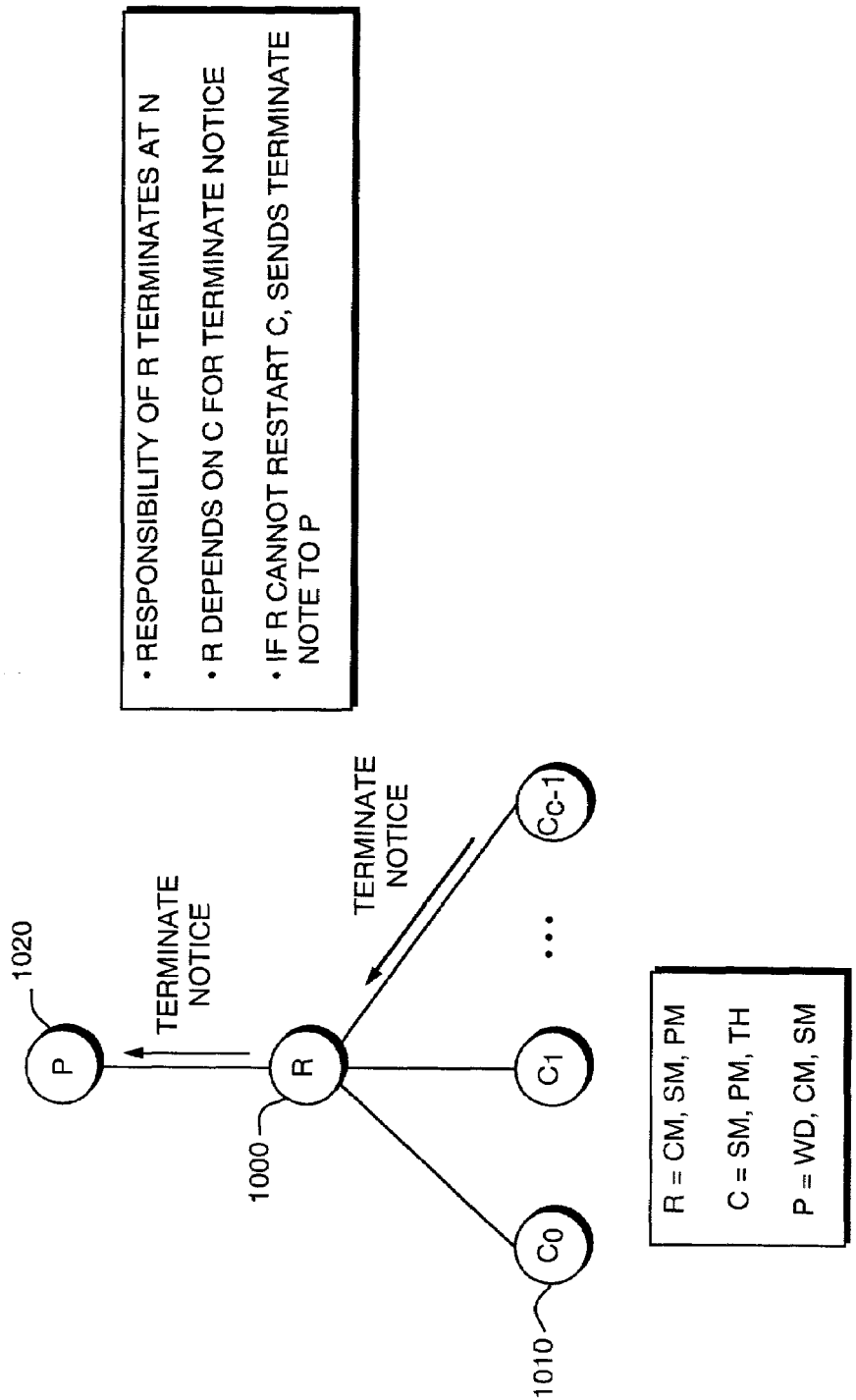
FIG. 10 illustrates how a root element of the AM handles terminate notices.

More particularly now, FIG. 9 is a software system diagram of Availability Manager process 900 according to the present invention. The AM 900 is implemented at a number of levels or domains. For example, a first domain may be the inter-card domain 901 responsible for the AM process at the level of a system card 250 component. The inter-card domain 901 of the Availability Manager 900 thus consists of a card manager (CM) element 911 associated with each of the system cards 250. The CM element 911 is then made responsible for containing failure modalities within its own domain, e.g., also the system card level, if at all possible.

Similarly, a next lower level domain is an "intra-card" or processor level domain 902. This has a System Manager (SM) associated with each of the processors 252 on the card. Thus, for example, a card manager CM0 has a number of lower level System Manager (SM) level components, including SM0 (912-0), SM1 (912-1), . . . , SMs (912-s). Likewise, CM1 has associated SM processes SM0, SM1 , . . . , SMt and considered to its child or lower level processes.

Given that each processor 252 may be executing a multi-tasking operating system, it is therefore quite common that a number of processes, process 0, process 1 , . . . , process p will be executing on any given processor 252. At a next lower level of the AM 900 hierarchy, a Process Manager (PM) is thus associated with each executing process on a specific processor 252. These include PM0 (913-0), PM1 (913-1), . . . PMp (913-$p$) in the illustrated example.

In a preferred embodiment, the CM level executes the aforementioned identity management process.

It should be understood that each process 913 may also have a number of concurrent threads (TH). However, it should be understood that in a preferred embodiment, the Availability Manager does not deploy components to monitor the specific threads TH components.

Failure modalities propagate up the hierarchy in a manner which is deterministic and such that the various elements of the Availability Manager hierarchy 900 may be as loosely coupled as possible. Consider the canonical diagram of FIG. 10. This figure illustrates a portion of the hierarchy of the Availability Manager 900. A given level of the hierarchy or root node, R, (1000) has associated with it a number of lower layer child nodes, C, (1010) and a parent node, P, (1020). A root node R maybe any of the immediate levels of the hierarchy, including the card manager CM, system manager SM, or process manager PM. The child nodes C0, C1 , . . . , Cc-1 are associated with each of the lower level elements of the hierarchy for the given root 1000. Similarly, the notation P represents the parent or next higher level of the Availability Manger hierarchy. Thus, in a case where the root node 1000 is considered to the be a system manager level SM 912, child elements C0, C1 , . . . , Cc-1 will be the next lower layer of the hierarchy, e.g., the process manager PM. The parent node 1020 will be, in this instance, the card manager CM.

It is the main responsibility of each root node R to perform a particular task upon termination of its associated child C. It limits its involvement to the next child C and does not, for example, attempt to control any of the lower layers below. As an example, the threads TH will not be controlled by the SM level since it is not involved directly in the creation of executing software elements at the TH level.

Each root R depends on its child level C for terminate notification. In a first instance, assume that the termination notification is given by a child C1 to the root R. Upon termination, the process R informs its respective higher level P of the termination, but only if this becomes necessary. The termination notification to P will not be made if the child process C can be restarted. Thus, only if the root level R of the hierarchy cannot restart its child C, then it sends a terminate notice to its parent P.

At the highest level of the Availability Manager 900, the watchdog timer (WD), typically a hardware component, is the parent of the connection manager CM. In this instance, the watchdog timer acts to bound the failure modalities and reactivate the system cards individually, if it is at all possible, prior to issuing a system reset command 922.

One perceived weaknesses in the present implementation is that if a watchdog timer hardware fails, the system will never properly reset, but a watchdog timer is such a simple mechanism, failure is extremely unlikely. In addition, a failure of C to notify R upon termination will also be catastrophic, but the watchdog timer can be used here to protect this from happening.

The watchdog timer may, for example, update at a given frequency such as every five seconds. A watchdog timer expiration threshold may be set at a multiple of update frequency that equals the number of expected updates per time slot. In this instance then, the worst case delay before hang is detected is the number of PM elements participating in the watchdog timer, times the expiration thresholds. In a preferred embodiment, since a failure to provide a watchdog update may occur at the end of the watchdog cycle, a period of time equal to twice the expected update period of all AM elements participating in the watchdog timer should expire before the watchdog timer sends a reset indication.

The watchdog timers 922 associated with each SC expect to receive periodic watchdog signals from their monitored elements that, in the preferred embodiment, include both CM and SM elements. The exclusion of the PM elements implies they may be restarted when they fail. Since the CM is affected by state changes external to the card in which it is running, any failure of the CM could result in the failure to detect these state changes. In one embodiment, the SM cannot be restarted and is therefore connected to the watchdog time to guarantee that the card will reset if it fails. The connection the SM has to the watchdog can be severed if and when it can be restarted. Upon expiration of this watchdog threshold time after missing a watchdog update, the watchdog timer will conclude that the monitored component, i.e., the associated system card 250 must be reset. These reset signals may be sent through a reset bus 927 as shown in FIG. 9. The fact that a given CM element is being reset is also passed through the reset bus to CM elements at the same level of the hierarchy. Such CM elements may make a decision as to whether they need to take action as a result of the peer element having a watchdog timer reset event.

The CM, SM, and PM elements preferably contain logic to detect if one of their components is hung. In the case of the CM, the hang detection threshold must be less than the watchdog threshold so that the hang event can be recorded to a persistent storage device. If the watchdog threshold is crossed, the system card 250 is immediately reset.

The CM and SM elements may contain logic to detect if one of their components is hung. The hang detection timeout threshold must be less than the watchdog threshold so that the hang event can be recorded to a persistent storage device. If the watchdog threshold is crossed, the system card 250 should be immediately reset.

The system card and processor components dedicate an interrupting high resolution timer on each system card. The interrupt thread servicing the high resolution timer sends a message to the components. If at least one reply is not received, the interrupt thread records the hang to persistent store and then terminates the hung component. The high resolution interrupt thread is thus considered to be more resilient than the component it is monitoring, but not as resilient as the watchdog timer.

The PM level is unique in its scale (i.e., the number of peer elements can grown very large). The implementation relies on the underlying operating system to provide a dedicated timer thread to each PM that provides the same services as the high-resolution interrupt thread provides to the CM and SM elements. The hang detection logic incorporated by the children elements of the PM (i.e., the threads) is application-specific given that the resulting tree of thread structure can be dynamic.

There are two potential instances of restart ability of the SM level components. If the SM level components are not restartable, the following process may occur. If, in the event that all SM peer elements lock up. In this event, the watchdog timer will detect the lockup event and reset will occur at the higher level. However, if the SM level components are restartable, then the CM level component will restart their associated high resolution timers. This, then, limits the impact of the restart to the same level without incurring the need to restart the CM level of the components in the hierarchy.

Figure 11:
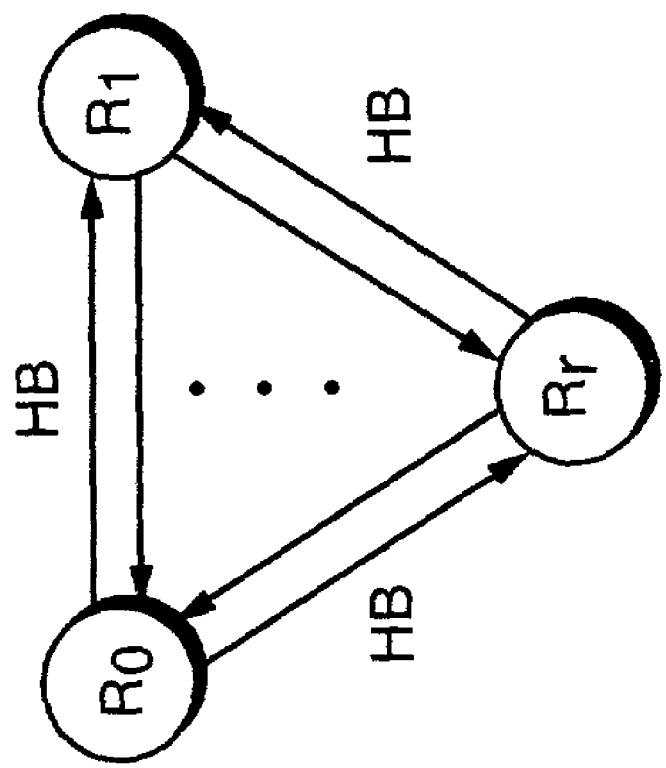
FIG. 11 illustrates how root processes communicate state information with their peers in the hierarchy.

As an alternative to the component level monitoring of hang state, the AM hierarchy elements may themselves perform active hang detection, in particular, the AM monitoring entities can also perform active hang detection among peers in the hierarchy. This can be implemented, for example, in a heartbeat network protocol as shown in FIG. 11. In this scheme, each root R0, R1 , . . . , Rr is associated with a particular level of the hierarchy is responsible for periodically sending a heartbeat signal to its respective peers. Each root process R treats a heartbeat failure of one of its peers as a termination failure, the termination failure is recorded to a persistent log, such as an available disk location, for assisting with debugging purposes. The termination failure is then reported to the higher level. In the preferred embodiment, the heartbeat network is implemented only at the CM level and SM level. In the case where the root level R is the system manager SM, the failure of the peer SM will be reported to the card manager CM. If the failure level is at the card manager CM, the peer failure will be detected by the watchdog timer 922, since the failed AM process will not report its heartbeat message.

What is important to recognize is that the heartbeat functions HB in each of the elements of the AM hierarchy perform active monitoring and terminate upon a failure of receipt of heartbeat from the monitored component. Ultimately, the card managers CM, as a whole, rely upon a hardware watchdog 922 to reset the card manager level CM should the restart option not be possible.

The HB function is expected to operate at a specific update frequency; that is, it is expected to provide to WD 922 an HB indication at defined time intervals. There is an internal heartbeat frequency within each instance of a system manager SM among its peers. The constraint here is that the SM heartbeat frequency is, in the preferred embodiment, selected to be higher than the watchdog timer frequency. Thus, this ensures that if at least one SM is not hung, it will detect that a hang condition exists among one of its peers and record it before the watchdog timer 922 expires and automatically resets.

The watchdog timer 922 may be implemented with a time slotted write to register scheme. In particular, each of the system elements expected to be monitored by the watchdog timer, such as the CMs 911 and SMs 912, may each have associated a time slot in which they write an identifying data word to a watchdog timer register. Logic in the watchdog timer 922 then detects a situation where an element fails to update its watchdog timer status, by determining when the value in the register does not change from one time slot to an adjacent time slot.

The reader can now understand how the invention provides a hierarchical, loosely-coupled mechanism to recover system state at as fine a grain as possible. For example, if an individual software process can be recovered, the Process Manager 913 will limit the failure modalities to that level of the Availability Manager, and stop propagation of the termination notification before it reaches the watchdog timer 922.

In a preferred embodiment, a domain level of the data processing system can have fault tolerant attributes associated with its extent. For example, a process 903 may be made separately responsible for saving its own state information, as well as the data structure and boundary conditions when it must terminate or on an event or on a periodic basis. When that respective process 903 is restarted by its PM 913, it recovers from its last known good state.

This is particularly important in an application such as networking, where the system is a router. A router database generally represents information which has been devised over a relatively long period of time. A master reset of the entire system state will require rebuilding router databases which may be extremely prohibitive in terms of availability. For example, it is not uncommon for router table rebuilding processes to take many seconds, or even minutes. During this time period, the data processing system associated with the end nodes of the network 100 would not be able to communicate (FIG. 1), therefore providing an undesirable situation. This is because the networking protocols associated with the control plane portion of routers can take a relatively long time to rebuild routing tables.

Ideally, restart of a failed component should be attempted; it can succeed within the time-out parameters of the networking protocols, the "failure" will not even be noticed by the other networking devices in the network or the end nodes. The interconnection topology of the routers as represented by their collective routing tables will remain stable.

For example, one would prefer to recover first at the process level 903, then at the processor level 902 and card level 901, failing to the system level watchdog reset 922 only in the most dire of circumstances. In general, the idea is that the fine grain state information is monitored and that state is restored upon failure if possible. If it cannot be recovered, then control is passed to the next higher level of the AM 900 to make such a determination. The architecture is passive in the sense that a failure model is triggered on termination versus an active determination of whether or not a process is running properly. The monitor processes are therefore necessarily more resilient than the elements they are monitoring.

It should be evident now that various extensions and modifications can be made to this preferred embodiment.

For example, process monitoring for hang states can also be performed by polling in addition to heartbeat protocol mechanisms among peers.

The operating system components may also maintain information about which resources a process 903 uses while running. The operating system can then provide this information to assist the AM element in determining whether or not the component 903 can be warm restarted (that is, restarted using the last known good state that was saved in persistent storage). Upon receipt of a process termination signal, the operating system can proceed as follows: if the error causes an inconsistency in the internal operating system state, then information can be provided to indicate that the particular process is not warm restartable.

For example, consider that a process makes use of an operating system wide resource, such as system memory, and the terminate modality of a program 903 is caused because the resource, i.e., memory, is exhausted. In such a circumstance, the process cannot typically be warm restarted.

In this embodiment, in the process termination code, a message will be sent from the process manager PM to the system manager SM indicating not only that the process is terminated, but also information indicating that the operating system believes the process cannot be warm restarted. Upon receiving this information, the respective system manager SM receives the message indicating that the operating system cannot continue. It will then determine directly that respective process PM cannot be warm restarted.

From the operating system perspective, if the process can be warm restarted, an entity separate from the operating system may be checked. For example, the process 913 itself may provide in its termination message an indication from its own perspective as to whether it is in a state that can be warm restarted. This information can be processed to the SM element, and considered when deciding to warm restart the process 913, or its decision to terminate and notify the CM.

It should be understood that the AM elements may also take into consideration the restart dependencies of their elements at the lower level of the hierarchy when making a restart decision. For example, turn attention to FIG. 12 where it is shown an example of an SM element that is monitoring three PM elements 913-*a*, 913-*b*, and 913-*q*. The PM element 913-*a* has associated with it a thread hierarchy TH as was explained in connection with FIG. 10. The PM elements 913-*a* and 913-*b* are components that are dependent upon one another. In particular, they are tagged in such a way that when one of them fails, they must all be restarted. However, the PM element 913-*q* is not a member of the same group of dependent AM elements. It is, for example, monitoring components that do not have failure dependency on other system components. The fact of failure dependency can be recorded in the SM element 912 by creating an element restart dependency table 955 as shown. In this example, the AM elements 913-*a* and 913-*b* associated with components that have a restart dependency are all labeled as members of the group X. The SM element 912 thus keeps a table indicating the process ids (PIDs) of each of the AM elements associated with the components in the dependent restart group X.

The restart dependencies are typically dictated by the particular component hierarchy may further define whether the restart must be cold, warm, or dependent upon other components. When the SM element 912 receives a failure indication from one of the PM elements 913-*a* or 913-*b* associated with group X, it checks the dependency table 955. Determining that a member of a group X has failed, the SM element will then proceed to request restart of the components associated with the AM elements of group X. However, it will not attempt to restart the components associated with AM element 913-*q* given that it is not a member of the group X. In this scenario, since not all of the AM elements at the child level of the SM element have failed, then no failure indication need be given to the parent CM element.

Although the example of FIG. 12 is shown in connection with an SM element monitoring PM elements, it should be understood that this restart dependency feature could also be implemented at other levels of the hierarchy 900. What is important to note is that the root element R may maintain information regarding the failure dependencies of the monitored child element C and restarting all dependent element C upon notification of failure of one of the child elements in an identified dependent element group 955. This is done without failing the other child elements that are not part of the same dependency group X.

While this invention has been particularly shown and described with references to preferred embodiments thereof, it will be understood by those skilled in the art that various changes in form and details may be made therein without departing from the scope of the invention encompassed by the appended claims.

What is claimed is:

1. A data processing system comprising:
   a. a plurality of data processing system components, the components each responsible for carrying out a subset of data processing system functions;
   b. a plurality of function domains, the domains having associated with them subset of the data processing system functions, with a plurality of peer domain level components thus carrying out the data processing functions for a given domain, and the plurality of domains forming a domain hierarchy, at least one component of at least one domain at a given level in the hierarchy providing a failure notification, which is of a hang state detected by a components peer element; and
   c. a system availability manager comprising:
      i. a plurality of Available Manager (AM) elements, each AM element associated with a corresponding one of the data processing system components, the AM elements thus also arranged in an AM hierarchy that parallels the domain hierarchy, at least one AM element connected to receive failure notification from one or more AM elements associated with the data processing system components associated with a next lower domain level, peer AM elements participate in a heartbeat protocol to detect a component hang state such that during their normal state execution, wherein peer AM elements located at the same level in the AM hierarchy provide a heartbeat signal notification in a determined sequence to at least one of its peer AM elements.

2. A system as in claim 1 wherein each AM element determines if the component in the next lower domain level from which a failure notification was received can be restarted.

3. A system as in claim 2 wherein each of the AM elements additionally determines if the failure-notifying component can be restarted, and if it can be restarted, the AM element making the determination causes that component to be restarted, without notifying a higher level AM element in the AM hierarchy.

4. A system as in claim 3 wherein if any of the AM elements determines that the failure-notifying component cannot be restarted, the determining AM element sends a failure notification to a higher AM component in the AM hierarchy.

5. A system as in claim 2 wherein the failure notification includes information as to whether the logical state of the component itself indicates the component can be restarted.

6. A system as in claim 2 wherein components are classified in the hierarchy with regard to a potential severity indication of their failure modalities.

7. A system as in claim 2 wherein each of the AM elements determines whether the associated component itself can be restarted without affecting operation of other data processing system components.

8. A system as in claim 2 wherein at least some of the components of the data processing system are operating system components, each of the AM elements runs an application space as a process under an operating system, and the failure notification is made by signaling the associated AM element through an operating system 9. A system as in claim 1 wherein the failure notification is caused by termination of processing by the monitored component.

10. A system as in claim 1 wherein the failure notification is caused by an error state in the monitored component.

11. system as in claim 1 wherein the AM element failure notification is constrained to the next higher AM element in the hierarchy.

12. A system as in claim 1 wherein the AM element failure notification is constrained to the next higher level AM element in the hierarchy, such that a higher level AM element in the hierarchy will then be given control over determining whether to send further failure notifications up the AM element hierarchy.

13. A system as in claim 1 wherein the data processing system components are both hardware and software components.

14. A system as in claim 13 wherein the software components include, but are not limited to, operating system hardware.

15. A system as in claim 13 wherein the software components comprise application program processes.

16. A system as in claim 1 wherein the failure notification is a component execution termination notice.

17. A system as in claim 1 wherein the failure notification is a hang state notice.

18. A system as in claim 1 wherein the heartbeat protocol is carried out for AM elements associated with a one of a card manager (CM) level or a system manager (SM) level in the AM hierarchy.

19. A system as in claim 18 wherein at least one of the peer AM elements reports the hang state by ceasing to send update signals to a hardware component.

20. A system as in claim 19 wherein the hardware component is a watchdog timer component.

21. A system as in claim 20 wherein the update signals are time slotted, such that a given AM element is assigned a predetermined slot in which the watchdog timer component expects to receive an update signal.

22. A system as in claim 21 wherein a failure to detect a hang state results in restarting the watchdog timer.

23. A system as in claim 21 wherein the heartbeat signal is a read of a unique value by the watchdog timer.

24. A system as in claim 21 wherein the update signal is a data word unique to the reporting AM element.

25. A system as in claim 1 wherein prior to the failure notification, at least one of a given group of data processing system components stores state information in a persistent storage medium.

26. A system as in claim 25 wherein the state information storage is program driven, event driven, periodically driven, or termination triggered.

27. A system as in claim 25 wherein the state information as selected from the group consisting of a machine state, application configuration state, or application data state.

28. A system as in claim 1 wherein the heartbeat protocol is not carried out for AM elements associated with data processing components having specific hang detection logic.

29. A data processing system comprising:
a. a plurality of data Processing system components, the components each responsible for carrying out a subset of data processing system functions;
b. a plurality of function domains, the domains having associated with them subset of the data processing system functions, with a plurality of peer domain level components thus carrying out the data processing functions for a given domain, and the plurality of domains forming a domain hierarchy, at least one component of at least one domain at a given level in the hierarchy providing a failure notification; and
c. a system availability manager comprising:
   i. a plurality of Available Manager (AM) elements, each AM element associated with a corresponding one of the data processing system components, the AM elements thus also arranged in an AM hierarchy that parallels the domain hierarchy, at least one AM element connected to receive failure notification from one or more AM elements associated with the data processing system components associated with a next lower domain level, the AM element failure notification is constrained to the next higher AM element in the hierarchy, wherein the AM failure notification to the higher level AM component in the AM hierarchy causes the AM elements that are peers of the failure-notifying AM elementto be terminated.

30. A data processing system comprising:
a. a plurality of data processing system components, the components each responsible for carrying out a subset of data processing system functions;
b. a plurality of function domains, the domains having associated with them subset of the data processing system functions, with a plurality of peer domain level components thus carrying out the data processing functions for a given domain, and the plurality of domains forming a domain hierarchy, at least one component of at least one domain at a given level in the hierarchy being restartable; and
c. a system availability manager comprising: a plurality of Availability Manager (AM) elements, each AM element associated with a corresponding one of the data processing system components, the AM elements thus also arranged in an AM hierarchy that parallels the domain hierarchy, at least one AM element connected to restart one or more AM elements associated with the data processing system components associated with a next lower domain level, the at least one AM element may access operating system component state information regarding whether an operating system underlying a terminating component of the plurality of data Processing system components considers that the component can be restarted.

31. A system as in claim 30 wherein the terminating component itself contains the operating system component state information.

32. A system as in claim 31 wherein the at least one AM element uses the operating system component state information to determine whether the component can be restarted.

33. A system as in claim 30 wherein upon receiving a termination notice, the AM element may access component originated state information regarding whether according to the components own logic, the component can be restarted.

34. A system as in claim 33 wherein the termination notice itself contains the component originated state information.

35. A system as in claim 34 wherein the AM element may also access operating system component state information regarding whether an operating system underlying the terminating component considers that the component can be restarted.

36. A system as in claim 35 wherein the AM element first uses the operating system component state information to determine whether the component can be restarted, and such indication is positive, then the AM element uses the component originated state information.

37. A system as in claim 30 wherein the AM element hierarchy includes a system manager root level, process manager child level, and card manager parent level in the AM element hierarchy.

38. A system as in claim 30 wherein the AM element hierarchy includes a card manager root level, system manager child level, and watchdog timer parent level in the AM element hierarchy.

39. A data processing system comprising:
   a. a plurality of data processing system components, the components each responsible for carrying out a subset of data processing system functions;
   b. a plurality of function domains, which are selected from the group consisting of system, card, processor, process, and application process threads, the domains having associated with them subset of the data processing system functions, with a plurality of peer domain level components thus carrying out the data processing functions for a given domain, and the plurality of domains forming a domain hierarchy, at least one component of at least one domain at a given level in the hierarchy being restartable; and
   c. a system availability manager comprising: a plurality of Availability Manager (AM) elements, each AM element associated with a corresponding one of the data processing system components, the AM elements thus also arranged in an AM hierarchy that parallels the domain hierarchy, at least one AM element connected to restart one or more AM elements associated with the data processing system components associated with a next lower domain level.

40. A system as in claim 39 wherein at least one thread domain does not have associated AM elements.

41. A data processing system comprising:
   a. a plurality of data processing system components which maintain internal state information, which is selected from the group consisting of processor execution state, configuration state, and application data state, in persistent storage to permit warm restart processing, the components each responsible for carrying out a subset of data processing system functions;
   b. a plurality of function domains, the domains having associated with them subset of the data processing system functions, with a plurality of peer domain level components thus carrying out the data processing functions for a given domain, and the plurality of domains forming a domain hierarchy, at least one component of at least one domain at a given level in the hierarchy being restartable; and
   c. a system availability manager comprising: a plurality of Availability Manager (AM) elements, each AM element associated with a corresponding one of the data processing system components, the AM elements thus also arranged in an AM hierarchy that parallels the domain hierarchy, at least one AM element connected to restart one or more AM elements associated with the data processing system components associated with a next lower domain level.

42. A system as in claim 41 wherein the system is deployed as a networking device, and the internal state information is selected from the groups consisting of routing table, forwarding table, switching table, or other networking configuration data.

43. A system as in claim 41 wherein an operating system component reclaims resources upon termination of a process element.

44. A system as in claim 41 wherein an operating system component maintains state information regarding resources in use by executing processes.

45. A system as in claim 44 wherein the operating system derives information regarding whether a process can be restarted by examining the state information regarding resources in use.

46. A system as in claim 41 wherein if component failure causes inconsistency in internal operating system state, the associated processes are considered to be nonrestartable.

47. A system as in claim 41 wherein a component will be subjected to a warm or cold restart process depending upon whether complete stored state information is available and valid.

48. A data processing system comprising:
   a. a plurality of data processing system components, the components each responsible for carrying out a subset of data processing system functions;
   b. a plurality of function domains, the domains having associated with them subset of the data processing system functions, with a plurality of peer domain level components thus carrying out the data processing functions for a given domain, and the plurality of domains forming a domain hierarchy, at least one component of at least one domain at a given level in the hierarchy being restartable; and
   c. a system availability manager comprising: a plurality of Availability Manager (AM) elements, each AM element associated with a corresponding one of the data processing system components, the AM elements thus also arranged in an AM hierarchy that parallels the domain hierarchy, the AM element hierarchy includes a process manager root level, thread child level, and system manager parent level in the AM element hierarchy, and at least one AM element connected to restart one or more AM elements associated with the data processing system components associated with a next lower domain level.

49. A data processing system comprising:
   a. a plurality of data processing system components, the components comprising system cards, processors, and software processes that execute on the processors, the components thus forming a function domain hierarchy;
   b. a plurality of Availability Manager (AM) elements, each AM element associated with at least one of the data processing system components, the AM elements also arranged in a hierarchy that parallels the domain hierarchy such that a card manager (CM) element in the AM hierarchy is associated with a system card component; a system manager (SM) element in the AM hierarchy is associated with a processor component; a process manager (PM) in the AM hierarchy is associated with a software process component; with at least one of the AM elements participating in an identity management protocol with at least one of the AM elements connected to restart components associated with a next lower domain level.

50. A system as in claim 49 wherein card manager (CM) element of the AM hierarchy performs an identity management protocol for system card components.

51. A system as in claim 50 wherein the identity management protocol identifies which system card is to be considered a master.

52. A system as in claim 49 wherein peer AM elements detect a hung component by sending a heartbeat signal at a determined time period interval.

53. A system as in claim 52 wherein the determined time period interval at which the heartbeat signal is sent is less than a time-out duration associated with a watchdog timer that is monitoring at least one AM element.

54. A system as in claim 52 wherein a heartbeat timeout threshold is selected so that if at least one AM element among a set of peer AM elements is hung, the peer AM element that detected the hang state will detect and record the hung state before expiration of a watchdog timer.

55. A system as in claim 52 wherein the heartbeat signals coupled from an AM element to a heartbeat register associated with the watchdog timer are time slotted.

56. A system as in claim 52 wherein the AM element and its peers are located at a system manager (SM) level in the AM hierarchy associated with monitoring processor components.

57. A system as in claim 49 wherein a hardware component detects an event that all AM elements at the same level hang.

58. A system as in claim 49 wherein a card manager (CM) level in the AM hierarchy is associated with a system card component, and a system manager (SM) level in the AM hierarchy is associated with a processor component, and wherein a failure notification by a card manager (CM) element is provided to a watchdog timer element.

59. A system as in claim 58 wherein the watchdog timer is connected to initiate a reset for selected components of the data processing system.

60. A system as in claim 59 wherein a reset initiated by the watchdog timer starts an identity management process in one of the components.

61. A system as in claim 60 wherein the identity management process executes in one of the AM elements.

62. A system as in claim 60 wherein the data processing system components comprise system cards, and the identity management process is executed to identify a master system card.

63. A system as in claim 62 wherein the identity management process identifies the master system card without using a prior central system resource set.

64. A system as in claim 63 wherein the identity management process uses information concerning physical location identification of the system cards, system card present information, and a register write protocol that ensures singular assertion of master state for a given system card.

65. A system as in claim 64 wherein the identity manager process ensures singular assertion of the master state by the process of a. setting a temporary master state; b. waiting a predetermined period of time; c. setting a final master state only if no other system card has asserted temporary or master state.

66. A data processing system comprising:
a. a plurality of data processing system components the components comprising system cards, processors, and software processes that execute on the processors, the components thus forming a function domain hierarchy;
b. a plurality of Availability Manager (AM) elements, each AM element associated with at least one of the data processing system components, the AM elements also arranged in a hierarchy that parallels the domain hierarchy such that a card manager (CM) element in the AM hierarchy is associated with a system card component; a system manager (SM) element in the AM hierarchy is associated with a processor component; a process manager (PM) in the AM hierarchy is associated with a software process component; with at least one of the AM elements connected to restart components associated with a next lower domain level, wherein if a given root element, R, in the AM hierarchy has at least one child element, C, and at least one parent element, P, the root element R is responsible for determining a failure notification only for its child elements C, and reporting the fact of a failed child AM element C to the parent element P if the child element C cannot be restarted.

67. A system as in claim 66 wherein a decision regarding whether a given child element C can be restarted is made from information provided by the child C with the failure notification.

68. A system as in claim 66 wherein a decision regarding whether a given child element C can be restarted is made from information provided by peer AM elements to the root element R.

69. A system as in claim 66 wherein a sub-group, X, of child element C are considered to have restart dependency, and upon failure notification of one element C in the group X, restarting all other elements C that are a member of the group X.

70. A system as in claim 69 wherein the elements C that are not members of the group X are not restarted.

71. A system as in claim 69 wherein the fact of the failed element C is not reported to the parent element P if all members of the group X can be restarted.

72. A method for determining which of a plurality of data processing system components are to assert a master state, and which are to assert a non-master state after a system reset with no retention of prior state information, the process comprising a join protocol that is executed on each system component, the join protocol comprising the steps of:
a. entering an initialization state;
b. determining a physical position for the component with respect to other components in the system;
c. determining a physical position for the component with respect to a card slot location in a backplane;
d. reading state information as to master state assertions by other components;
e. temporarily initializing a local master state register to the asserted state, if no other component has asserted the master state;
f. waiting a predetermined pause period;
g reading other components master state assertions; and
h. committing to assume the master state for further execution should no other component have asserted the master state during the waiting period.

73. A method as in claim 72 wherein the step of committing to assume the master state is as a Physical Default Master state.

74. A method as in claim 73 wherein the step of committing to assume the master state additionally comprises the step of: transitioning to a Logical Default Master if the read of the master state assertions by the other components indicates that no other component has asserted the master state.

75. A method as in claim 73 wherein while in a Logical Default Master mode, additionally comprising the steps of: in the commit step, determining if any other component has a higher priority location with a master state asserted; waiting a secondary pause period; and if so, then de-asserting the master state and committing to a non-master state.

76. A method for determining which of a plurality of data processing system components are to assert a master state, and which are to assert a non-master state after a system reset with no retention of prior state information, the process comprising a join protocol that is executed on each system component, the join protocol comprising the steps of:
a. entering an initialization state;
b. determining a physical position for the component with respect to other components in the system;
c. reading state information as to master state assertions by other components;
d. temporarily initializing a local master state register to the asserted state, if no other component has asserted the master state;
e. waiting a predetermined pause period, wherein the pause period is greater than the longest expected initialization process for components in the system to read a master state register, determine a state that it should assume, and assume the determined state;
f. reading other components master state assertions; and
g. committing to assume the master state for further execution should no other component have asserted the master state during the waiting period.

77. A method for determining which of a plurality of data processing system components are to assert a master state, and which are to assert a non-master state after a system reset with no retention of prior state information, the process comprising a join protocol that is executed on each system component, the join protocol comprising the steps of:
a. entering an initialization state;
b. determining a physical position for the component with respect to other components in the system;
c. determining a physical position for the component with respect to respect to a card slot location in a backplane;
d. reading state information as to master state assertions by other components;
e. temporarily initializing a local master state register to the asserted state, if no other component has asserted the master state;
f. waiting a predetermined pause period;
g. reading other components master state assertions;
h. committing to assume the master state for further execution should no other component have asserted the master state during the waiting period; and
i. executing a Depart State Machine upon receipt of a reset command from another data processing system component.

78. A method as in claim 77 wherein the Depart State Machine comprises the step of: determining if a departed component was previously the master; and if so, executing the join protocol.

79. A method as in claim 77 wherein the reset command is received from a watchdog timer.

80. A method as in claim 79 wherein a watchdog timer issues the reset command upon termination notification from an Availability Manager (AM) process.

81. A method as in claim 80 wherein the AM process is a distributed hierarchy of AM processes having loosely coupled AM process elements that monitor corresponding data processing system components.

82. A method as in claim 81 wherein the AM element hierarchy includes a card manager root level, system manager child level, and watchdog timer parent level in the AM element hierarchy.

83. A method as in claim 81 wherein the AM element hierarchy includes inter-card, intra-card, and processor levels.

84. A method as in claim 81 wherein the data processing system components comprise system cards, processors, and software processes associated with inter-card, intra-card, and processor levels in the AM hierarchy, respectively, and a card manager (CM) level in the AM hierarchy is associated with a system card component, a system manager (SM) level in the AM hierarchy is associated with a processor component, a system manager (SM) level in the AM hierarchy is associated with an operating system software component, and a process manager (PM) level in the AM hierarchy is associated with an executing application process software component.

85. A method as in claim 81 wherein one or more of the AM elements participate in an identity management protocol.

86. A method as in claim 77 wherein the reset command is invoked by a restart decision made by an AM element.

87. A hierarchical, distributed, loosely coupled Availability Management (AM) method for recovering from failure of execution of one or more data processing system components, wherein the data processing system components include at least two or more system cards, and at least two AM element processes are associated with monitoring the status of at least two of the system cards, the process comprising the steps of:
a. executing a plurality of AM element processes in a multi-tasking environment, the AM element processes arranged in a hierarchy, with the hierarchy of the AM elements corresponding to a failure modality hierarchy of the data processing system components;
b. within a given AM element process, receiving a termination notice from one of the data processing system components;
c. if the data processing system component can be restarted by the AM element process, then restarting the component;
d. if the data processing system component cannot be restarted by the AM element process, providing a termination notice to a higher level AM element process;
e. terminating execution of the AM element process;
f. if one of the system cards provides a termination indication to its associated AM process, determining if the system card can be restarted:
g. if the system card can be restarted, then asserting a system card restart command;
h. if the system card cannot be restarted by the AM process, asserting a system reset signal; and
i. thereby constraining restarts of the entire system only to instances where lower level component parts cannot be restarted.

88. A method as in claim 87 additionally comprising: failing over to a second system card if in step (h) the system card can be restarted.

89. A method as in claim 87 wherein an identity management protocol is executed as part of restarting a higher level component.

90. A method as in claim 87 wherein peer AM elements participate in a heartbeat protocol to detect a component hang state in other peered AM elements.

91. A method as in claim 90 wherein the heartbeat protocol is providing a heartbeat signal in a determined sequence to peer AM elements.

* * * * *